MAGNETIC RECORDING AND REPRODUCING SYSTEM FOR VIDEO SIGNALS

Filed Aug. 1, 1961 4 Sheets-Sheet 1

INVENTOR
TATSUO KONISHI
BY Roy C. Hopgood
ATTORNEY

Oct. 19, 1965 TATSUO KONISHI 3,213,193

MAGNETIC RECORDING AND REPRODUCING SYSTEM FOR VIDEO SIGNALS

Filed Aug. 1, 1961 4 Sheets-Sheet 2

INVENTOR
TATSUO KONISHI
BY Roy C. Hapgood
ATTORNEY

Oct. 19, 1965 TATSUO KONISHI 3,213,193

MAGNETIC RECORDING AND REPRODUCING SYSTEM FOR VIDEO SIGNALS

Filed Aug. 1, 1961 4 Sheets-Sheet 3

INVENTOR
TATSUO KONISHI
BY Roy C. Hopgood
ATTORNEY

INVENTOR
TATSUO KONISHI
BY Roy C. Hopgood
ATTORNEY

United States Patent Office
3,213,193
Patented Oct. 19, 1965

3,213,193
MAGNETIC RECORDING AND REPRODUCING SYSTEM FOR VIDEO SIGNALS

Tatsuo Konishi, Tokyo, Japan, assignor to Nippon Electric Company, Limited, Tokyo, Japan, a corporation of Japan Filed Aug. 1, 1961, Ser. No. 128,579
10 Claims. (Cl. 178—6.6)

This invention relates to a magnetic recording and reproducing system for video signals and more particularly to a system containing means for detecting any contractions or expansions of a magnetic tape between the time that signals are recorded thereon and reproduced therefrom and also containing means for automatically compensating for such contractions or expansions so as to minimize distortion in the reproduced signal.

When video signals, such as television pictures or the like, are recorded on magnetic tape it has been found that the signals reproduced from the tape are not faithful reproductions of the signals recorded thereon because the dimensions of the tape vary with changes in temperature, humidity, and the like. Since the environmental conditions are never exactly the same when the signal is reproduced as they were when it was recorded, the reproduced signals will be either lengthened or shortened in time duration with respect to the signals originally recorded on the tape. Furthermore, these variations are not necessarily uniform because different portions of the tape may expand or contract more than others for the same difference of temperature or humidity, and different portions of the tape might be at different temperatures or humidities when those portions pass the reproducing head. For best reproduction of the recorded signals, therefore, it is necessary to have some means of compensating for these temperature and humidity induced variations when the video signal is reproduced. If this compensation is neglected, the reproduced television picture will be distorted with respect to the television picture recorded on the tape, and the vertical synchronization might become so disturbed as to produce jitter or incomplete scanning in the reproduced television picture.

Accordingly, one object of this invention is to provide a magnetic recording and reproducing system for recording video signals and for reproducing the video signals with a high degree of fidelity.

Another object of this invention is to provide means for selectively expanding or contracting a magnetic recording tape while it is being moved past a magnetic recording or reproducing head.

A further object of this invention is to provide means for selectively expanding or contracting a magnetic recording tape in such manner as to counteract any variations in the physical dimensions of the tape between its condition when a signal is recorded thereon and its condition when the signal is reproduced therefrom.

An additional object of this invention is to provide means for detecting any expansion or contraction of a magnetic recording tape between its condition when a signal is recorded thereon and its condition when the signal is reproduced therefrom.

Another object of this invention is to provide a servo system adapted to be coupled between the above noted detection means and the above noted tape expansion-contraction means for automatically expanding or contracting a magnetic recording tape in such a manner as to counteract any variations in the physical dimensions of the tape between its condition when a signal is recorded thereon and its condition when a signal is reproduced therefrom.

Other objects and advantages of the invention will become apparent to those skilled in the art from the following description of several illustrative embodiments thereof, as illustrated in the attached drawings, in which.

In general terms, the novel magnetic recording and reproducing structure of this invention comprises two magnetic recording/reproducing heads which are adapted to scan a magnetic tape on alternate recorded tracks with an overlapping scan on the portion of the tracks corresponding to the vertical synchronizing signal portion of the video signals recorded thereon. In this overlapping scan arrangement one head scans the vertical synchronizing signal recorded at the end of one recorded track while the other head scans the same vertical synchronizing signal as recorded at the start of the next track. If the physical dimensions of the magnetic tape are the same in the reproducing period as they were in the recording period, the vertical synchronizing signals detected by the two heads will be in phase, but if the tape has expanded or contracted one set of vertical synchronizing pulses will either lead or lag the other set of pulses in phase. A comparison circuit is coupled to the two recording/reproducing heads to compare the phase of the two sets of vertical synchronizing pulses and thereby to develop a signal indicating the type and amount of physical variation in the magnetic tape. This signal is coupled via a servo system to a tape expansion-contraction means which artificially expands or contracts the tape to compensate for any variations detected by the pulse comparison circuit.

Figures 1, 2, 3:
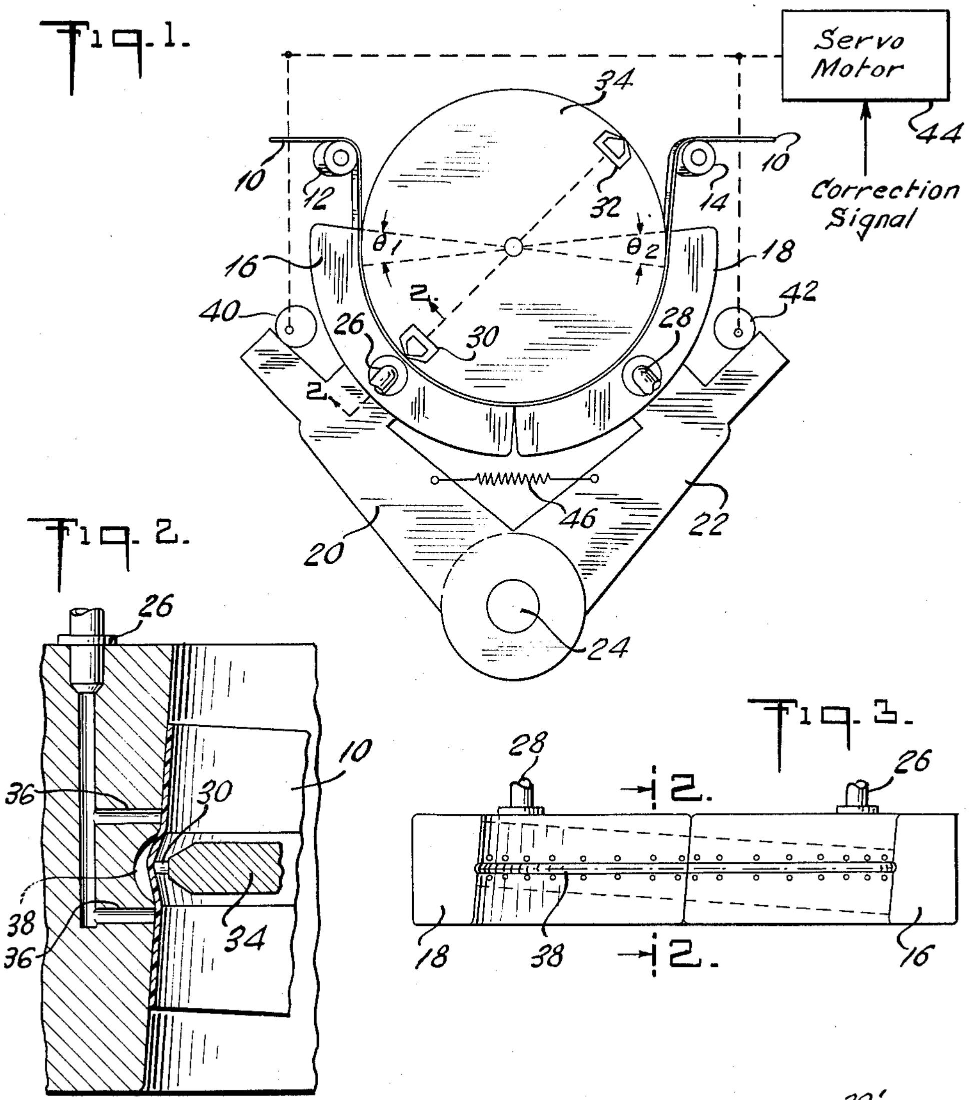
FIG. 1 is a plan view of one illustrative tape recording and reproducing structure of this invention.
FIG. 2 is an elevation section taken of the line 2—2 of FIG. 1.
FIG. 3 is a perspective elevation view of the embodiment shown in FIG. 1 as seen from the top of FIG. 1.

FIG. 1 shows one illustrative recording and reproducing structure which can be used in the system of this invention. In this particular embodiment, magnetic tape 10 is fed into a recording and reproducing assembly via a first guide roller 12 and out of the assembly via a second guide roller 14. Within the recording and reproducing assembly the tape 10 contacts the curved inner surface of two movable tape guide members 16 and 18 which are journaled through supporting arms 20 and 22 to a shaft 24. Each of the tape guide members 16 and 18 are fitted respectively with vacuum intake lines 26 and 28, which are attached to a vacuum pump not shown. The vacuum introduced into guide members 16 and 18 is used to draw the tape 10 against the curved surfaces of the guide member by suction.

As magnetic tape 10 moves around the curved surface of guide members 16 and 18 it is scanned by a pair of magnetic reproducing/recording heads 30 and 32 which are mounted in a rotatable disc member 34. The rotatable disc member 34 is journaled for rotation in a supporting structure which is not shown in the drawings but which will be apparent to those skilled in the art. FIG. 2 shows the relationship between tape 10, disc 34, and guide member 16 more clearly. The vacuum inlet 26 of guide member 16 communicates with a plurality of channels 36 which open on the face of guide member 16. Therefore, when a vacuum is applied to vacuum inlet 26 the magnetic tape 10 will be drawn against the surface of guide member 16 and will be securely held there by the suction applied through channel 36. In the center of guide member 16 a recess 38 is formed under the tape 10 and the tape is scanned in this area by the magnetic reproducing/recording heads mounted on disc 34. The spacing between guide member 16 and rotating disc member 34 is arranged such that magnetic tape 10 will be expanded slightly by contact with the magnetic recording/reproducing heads under normal conditions as illustrated in FIG. 2. From this starting condition the tape 10 will be contracted by increasing the spacing between guide 16 and disc 34 or expanded by decreasing the spacing between guide 16 and disc 34. In this embodiment of the invention the disc 34 is mounted in fixed position and the spacing between guide 16 and disc 34 is controlled by cams 40 and 42 (FIG. 1) which are driven simultaneously by a servo motor 44. When servo motor 44 rotates in one direction it opens arms 20 and 22 and increases the spacing between the disc 34 and tape guide members 16 and 18. When servo motor 44 is rotated in the opposite direction it allows arms 20 and 22 to be closed by the pressure of spring 46 to decrease the spacing between disc 34 and tape guide members 16 and 18. Thus a rotation of servo motor 44 in one direction acts to expand the tape while a rotation of the motor in the other direction acts to contract the tape. This tape expansion-contraction mechanism is used to selectively expand or contract the tape in accordance with a correction signal to compensate for any variations in the physical dimensions of the tape between its recording and reproducing condition. The correction signal, which indicates a contraction or expansion of the tape, is derived from the overlapping scan of recording/reproducing heads 30 and 32.

As shown in FIG. 1, heads 30 and 32 are simultaneously engaged with magnetic tape 10 at the start and at the end of their recording tracks thereacross within the overlapping scan angles $\theta 1$ and $\theta 2$. The rotation of disc 34 is synchronized with the video signal by well known prior art techniques such that the recording/reproducing heads 30 and 32 will occupy the overlapping scan areas $\theta 1$ and $\theta 2$ during the vertical synchronizing signal portion of the video input signal. Therefore each vertical sync signal will be recorded at two separate regions on magnetic tape 10; at the start and at the end of each recorded track. These overlapping signals will be perfectly synchronized when they are recorded, since they are recorded from a common source, but if the dimensions of the tape should change between the recording and reproducing periods the overlapping signals will be out of phase with each other when they are reproduced. Therefore the phase relation between the outputs of the two recording/reproducing heads 30 and 32 in their overlapping scan period will give an indication of any expansion or contraction of tape 10 between the recording conditions thereof and the reproducing conditions thereof. This phase difference indication can then be used to generate a correction signal which either expands or contracts magnetic tape 10 by means of the expansion-contraction mechanism described above to compensate for these variations.

Figure 4:
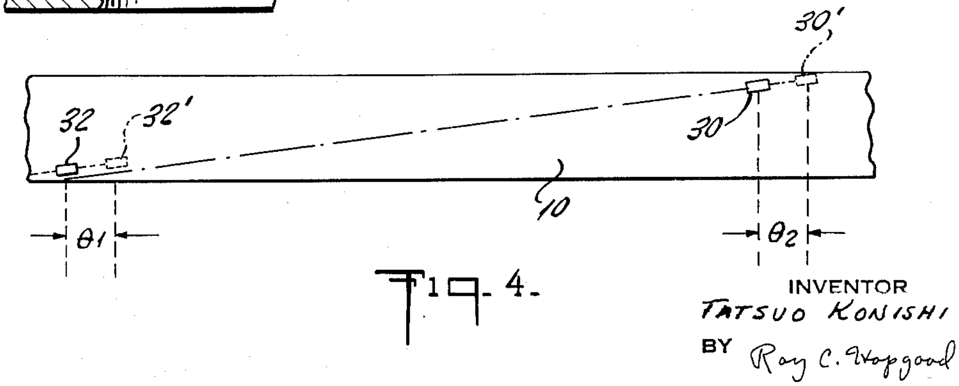
FIG. 4 is a plan view of a magnetic tape showing one illustrative recording track as traced thereacross by the recording and reproducing structure of this invention.

FIGS. 3 and 4 show the recording tracks traced by the recording/reproducing heads 30 and 32 across the magnetic tape 10. In this particular embodiment of the invention the tracks are traced obliquely across the surface of magnetic tape 10, in accordance with well known prior art techniques. This is done by moving magnetic tape 10 obliquely across the inner surface of guide members 16 and 18 as illustrated in FIG. 3. It will be understood by those skilled in the art that guide rollers 12 and 14 must be slightly skewed in order to guide the tape 10 in this oblique path. FIG. 4 indicates the overlapping scan portion on magnetic recording tape 10. It will be seen that head 32 starts to trace its track across tape 10 shortly before head 30 finishes its track thereacross. Therefore the two heads are simultaneously in contact with the magnetic tape in the time increment corresponding to angles $\theta 1$ and $\theta 2$ which, as indicated above, falls in the vertical synchronizing signal portion of the input video signal. This is shown more clearly in the waveforms of FIG. 5 where waveform (A) shows a normal television video signal such as applied to the recording/reproducing heads during the recording period, waveform (B) shows the output signal of head 32 during the reproducing period, waveform (C) shows the output of head 30 during the reproducing period, and waveform (D) indicates a gating pulse which is used to select a portion of the overlapping signal period in which the output of the two heads is compared to detect any phase differences thereinbetween. During the recording period the video signals of waveform (A) are simultaneously applied to both recording/reproducing heads 30 and 32. Thus the vertical synchronizing signals recorded in the overlapping scan period of the two heads must necessarily be in phase when they are recorded. Therefore during the reproducing period any phase difference between the output of head 32 (waveform B) and head 30 (waveform C) will be an indication that the tape has either expanded or contracted since the signals were recorded thereon.

Figure 5:
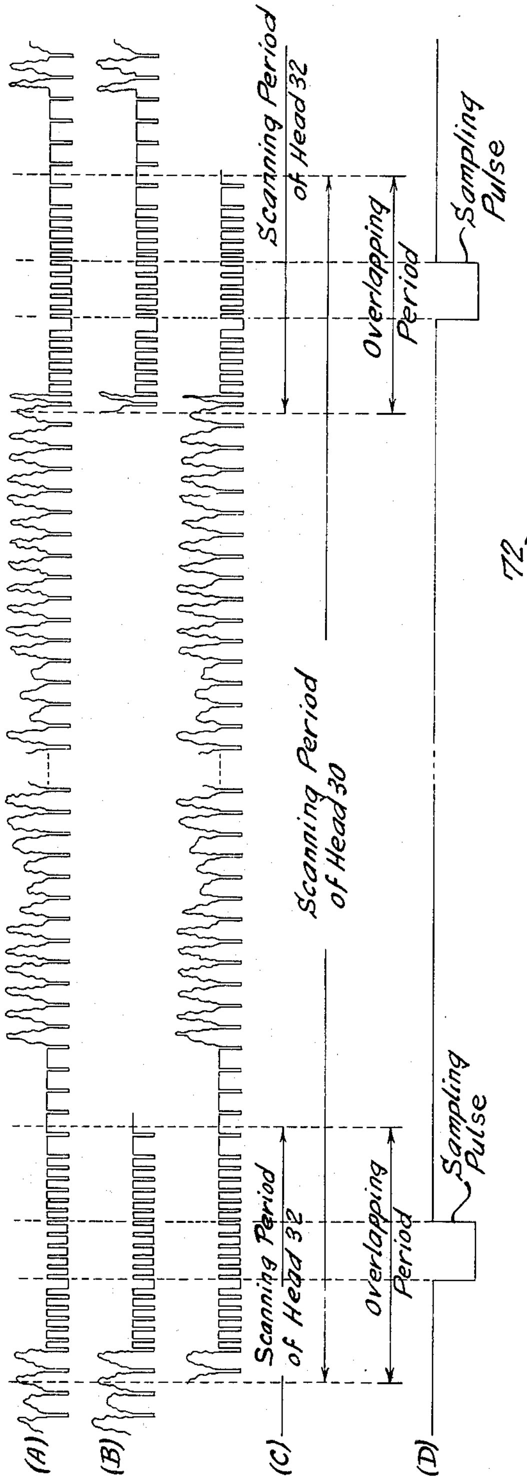
FIG. 5 is a set of waveforms showing the input signals to and the output signals from the recording and reproducing structure shown in FIGS. 1, 2, and 3.
Figure 8:
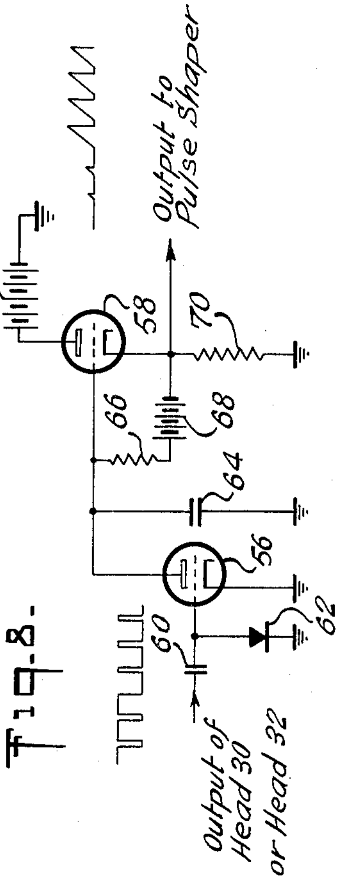
FIG. 8 shows one illustrative sync separator circuit which can be used in the block diagram circuit of FIG. 6.
Figure 6:
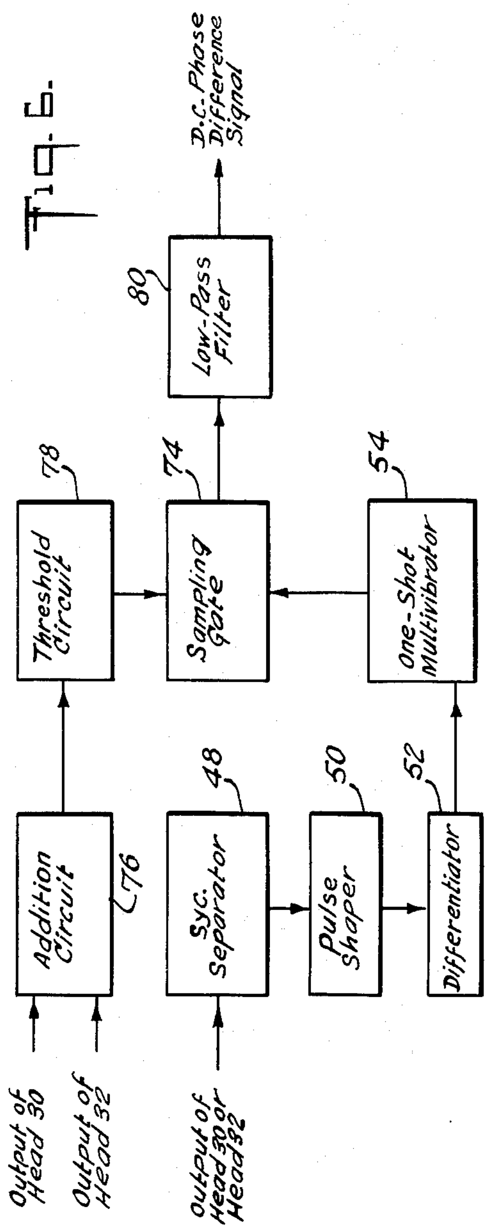
FIG. 6 is a block diagram of one illustrative circuit for detecting any expansions or contractions of the magnetic tape used in the recording and reproducing structure of this invention.

FIGS. 6 and 8 show one illustrative circuit for comparing the output of the two heads during the overlapping scan period to detect any phase diffierence thereinbetween. Referring to FIG. 6, the sampling pulse shown in waveform D of FIG. 5 is generated by applying the output of head 30 or head 32 to a sync separator circuit 48 which is adapted to be actuated by the narrow positive going pulses of the vertical sync signal but not by the wide positive going pulses thereof. The output of sync separator 48 is applied to pulse shaper 50, which squares the output of separator 48. The output of pulse shaper 50 is differentiated by differentiator 52, which triggers a one-shot multivibrator 54 to produce the sampling pulse shown in waveform D of FIG. 5. FIG. 8 shows one suitable mechanization of sync separator 48. This particular mechanization comprises a pair of triode amplifiers 56 and 58 which are coupled together in a bootstrap sweep circuit which produces output sweeps in response to the negative going sync pulses but not in response to the positive going sync pulses. The sync pulses are applied to the grid of triode 56 through an input capacitor 60 and the grid of tube 56 is clamped to ground by a diode 62. With this input circuit arrangement, the grid of tube 56 cannot go positive because of the clamping action of diode 62. Thus the sync pulses applied to the grid of tube 56 will all be negative in polarity. Therefore triode 56 will be cut off for a relatively short interval when the narrow negative going sync pulses are applied to condenser 60 but it will be cut off for a relatively long interval when the wide negative going sync pulses are applied to capacitor 60. The wide negative going pulses, of course, occur only in the vertical synchronizing signal portion of the video input signal.

The plate voltage for triode 56 is applied through a load resistor 66 from a battery 68, which is connected in series between load resistor 66 of triode 56 and resistor 70 of triode 58. The plate voltage for triode 58 is supplied by a second battery 72 which is coupled between a plate of triode 58 and ground. In the absence of the input signal triode 56 conducts, capacitor 64 is substantially uncharged, and triode 58 is conducting at a relatively low level of conduction because it is connected as a cathode follower and its grid is grounded by the conduction of triode 56.

When triode 56 is cut off, however, the ground is removed from the grid of triode 58 and the grid then begins to move in a positive direction under the influence of battery 68. It will be apparent to those skilled in the art that this positive rise will be exponential in nature because of the uncharged condition of capacitor 64. It will be also understood that the specific rise time of the grid voltage will be determined by the RC time constant of the circuit loop comprising capacitor 64, resistor 66, battery 68, and resistor 70. This time constant is preferably selected to be long with respect to narrow negative going sync pulses so that the circuit will separate the narrow negative pulses from the wide negative pulses. If the cutoff time of triode 56 is short in duration, capacitor 64 will only have time to charge up to a relatively low level before it is discharged by conduction through triode 56. This situation is indicated by the waveforms on the drawings of FIG. 8 where it is shown that the relatively narrow negative input produces only small pips on the cathode of triode 58. If triode 56 is cut off for a longer period of time, however, capacitor 64 will have time to charge to a higher level as indicated by the relatively large output sweeps on the cathode of triode 58. Thus the circuit will produce relatively large saw tooth output pulses in response to the relatively wide negative going sync pulses but not in response to the other sync pulses. When the output signal on the cathode of triode 58 is squared and then differentiated the result is a trigger signal which occurs only in the vertical synchronization portion of the video signal. This trigger signal is used to trigger one-shot multivibrator 54 to produce the sampling pulse shown in waveform D of FIG. 5.

Figure 9:
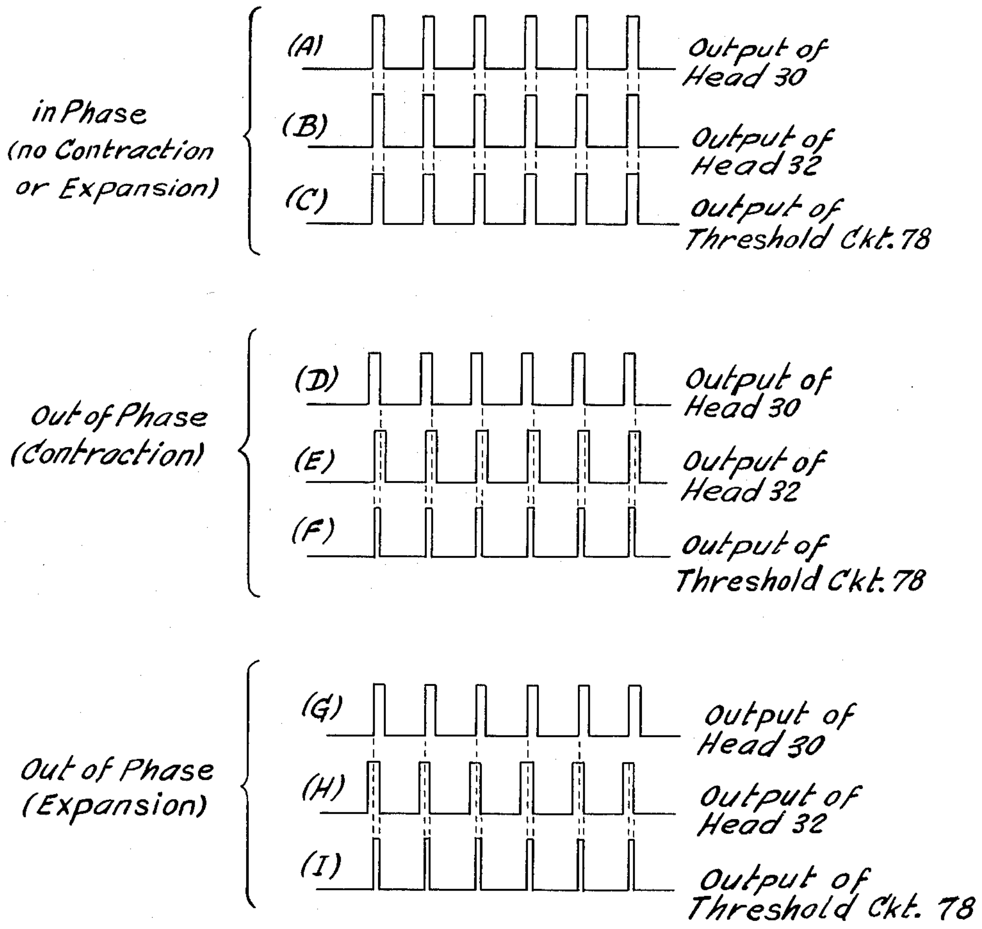
FIG. 9 is a set of waveforms showing how signals are compared in the circuit of FIG. 6 to detect expansions or contractions in the magnetic tape.

The sampling pulse from multivibrator 54 is applied to a sampling gate 74 which is coupled to a phase comparison circuit. There are several ways of comparing the phase of the output signal from heads 30 and 32 during the sampling period, but one such method is to add the output of head 30 to the output of head 32 in an addition circuit 76 and then to clip off the lower half of the combined signal in a threshold circuit 78 to generate a comparison signal whose pulse width is determined by the amount of overlap in the signals from head 30 and head 32. This condition is shown more clearly in the waveforms of FIG. 9 which show the phase relationship in the in-phase and out-of-phase conditions between the input signals to addition circuit 76. Waveforms (A), (B) and (C) of FIG. 9 show respectively the output of head 30, the output of head 32, and the output of threshold circuits 78 when the output of the two heads are in perfect synchronism. Waveforms (D), (E) and (F) of FIG. 9 show respectively the output of head 30, the output of head 32, and the output of threshold circuit 78 when the output signals of the heads have been thrown out of phase by a contraction in the magnetic tape. Waveforms (G), (H) and (I), of FIG. 9 show respectively the output of head 30, the output of head 32, and the output of threshold circuit 78 when the output signals from the two heads have been thrown out of phase by an expansion in the tape. It will be noted that the output pulses from threshold circuits 78 are of maximum width only when the two signals are in phase and that they decrease in width for the out of phase conditions caused either by contraction or expansion of the tape. Therefore if the output of threshold circuit 78 is filtered, the best conditions for reproduction can be achieved by maximizing the D.C. output voltage of the filter circuit. This is done as shown in FIG. 6 where a low pass filter 80 is coupled to sampling gate 74, which acts to gate the output of threshold circuit 78 into low pass filter 80 during the sampling period and to block the input to low pass filter 80 at all other times. It should be noted that the above described sampling and comparison circuit does not necessarily require an automatic adjustment circuit to be effective. For example, the output of low pass filter 80 might be coupled to a D.C. voltmeter and the servo motor 44 shown in FIG. 1 might be replaced by a manual crank coupled to cams 40 and 42. The best reproduction conditions could then be achieved by manually turning the crank for a maximum voltage reading on the meter. It will therefore be apparent that the automatic servo system mentioned above is not necessary to the basic combination of this invention. The servo system will, however, be desirable in many applications of this invention, and one suitable type of servo system is illustrated in the block diagram of FIG. 7.

Figure 7:
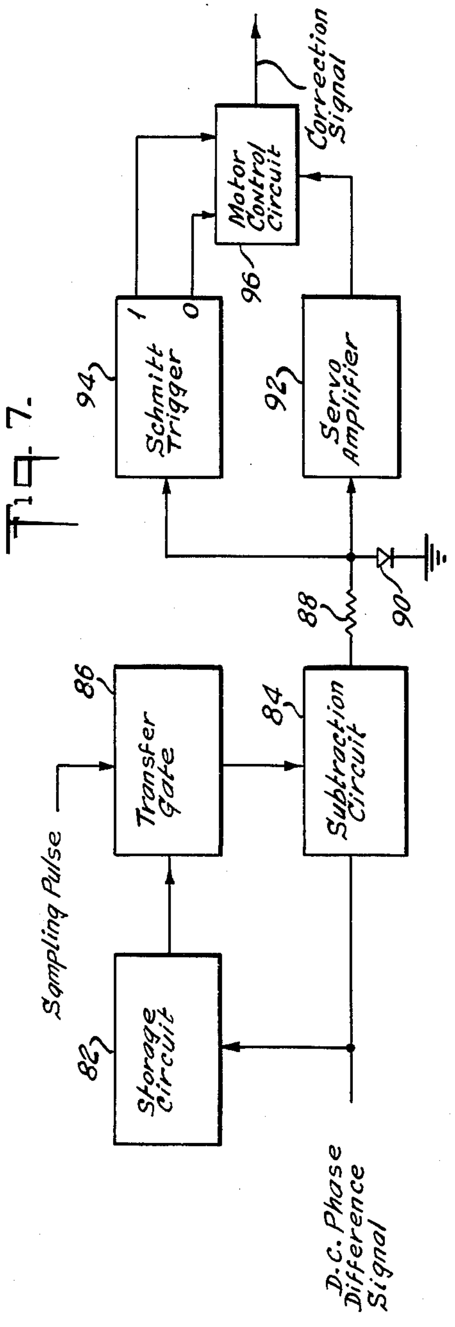
FIG. 7 is a block diagram of one illustrative circuit for automatically expanding or contracting the magnetic tape used in the recording and reproducing of this invention to compensate for variations detected by the circuit of FIG. 6.

Referring to FIG. 7, the D.C. phase difference signal produced by the circuit of FIG. 6 can be used to generate a correction signal for servo motor 44 (FIG. 1) by comparing the level of the D.C. phase difference signal in one sampling period to the level in the preceding sampling period. This is done by temporarily storing the D.C. phase difference signal in a storage circuit 82 and then subtracting the stored D.C. phase difference signal from the phase difference signal of the next sampling period in a subtraction circuit 84. A positive output of the subtraction circuit will indicate that the D.C. phase difference signal is rising in amplitude and a negative output will indicate that the D.C. phase difference is falling in amplitude. The magnitude of the signal will, of course, indicate the amount of rise or fall. The stored D.C. phase difference signal is preferably gated into subtraction circuit 84 through transfer gate 86 which is enabled by the sampling pulse generated by one-shot multivibrator 54 of FIG. 6. Since the best reproducing conditions are obtained when the D.C. phase difference signal is maximized, a correction signal is only required when the D.C. phase difference signal is dropping in amplitude, i.e. when the output of subtraction circuit 84 is negative in polarity. Therefore a resistor 88 and a diode 90 are coupled to the output of subtraction circuit 84 to eliminate the positive going output thereof. When the output of subtraction circuit 84 goes positive, diode 90 conducts and grounds one end of resistor 88 so that the output voltage of subtraction circuit 84 is dropped across resistor 88. When the output of subtraction circuit 84 is negative, however, diode 90 cuts off and the negative output voltage is therefore applied to a servo amplifier 92 and to a Schmitt trigger 94. The output of servo amplifier 92 and Schmitt trigger 94 are coupled to a motor control circuit 96 which produces the correction signal for servo motor 44 in FIG. 1. It will be understood by those skilled in the art that this correction signal must contain two items of information: the direction in which servo motor 44 is to turn and the speed with which it should turn. The speed information is provided by servo amplifier 92, whose output voltage level increases in proportion to the drop in the D.C. phase difference signal. This means that the servo motor will be asked to produce a small torque when the drop in the D.C. phase difference signal is small and a large torque when the drop in the D.C. phase difference is large. The direction of rotation is indicated by the Schmitt trigger in which one state is taken to represent clockwise rotation of the servo motor and the other state to represent counterclockwise rotation of the servo motor. The Schmitt trigger circuit, which is well known to those skilled in the art, is a bistable circuit which responds to D.C. levels on its input terminal. In the absence of an input voltage the Schmitt trigger will rest in one state, but when the input voltage rises above a predetermined threshold the Schmitt trigger will flip to its other state and remain in this other state so long as the input voltage level remains above the threshold level. When the voltage level falls below the threshold level the Schmitt trigger circuit returns to its original state. Since the Schmitt trigger is responsive to the D.C. voltage level on its input, it can therefore detect whether or not the servo motor is turning in the right direction because when the servo motor is turning in the right direction the output voltage level of subtraction circuit 84 will decrease and approach zero but when the servo motor is turning in the wrong direction the output of subtraction circuit 84 will increase. Therefore the Schmitt trigger circuit will automatically select the proper direction of rotation because of the inherent characteristics of its input circuit. Thus the information applied to motor control circuit 96 by servo amplifier 92 and Schmitt trigger 94 are sufficient to meet the requirements for the correction signal input to servo motor 44. Motor control circuit 96, of course, is adapted to translate its input signals into the proper form for the particular servo motor utilized in any specific embodiment of the invention. There are many suitable servo motor circuits which can be used, and each particular motor will require its own particular type of motor control circuit as will be apparent to those skilled in the art.

It should be noted here that the detection circuit of FIG. 6 and the automatic servo circuit of FIG. 7 are merely examples of one possible means for detecting the expansion or contraction of the magnetic tape and for automatically expanding or contracting the tape to compensate for those variations. There are many other circuits in which the overlapping sync pulses can be compared to detect the phase difference thereinbetween, and there are many other servo circuits for producing a correction signal to automatically compensate for the phase difference to produce the best reproducing conditions.

From the foregoing discussion it will be apparent that this invention provides a novel magnetic recording and reproducing system for recording video signals and for reproducing the video signals with a high degree of fidelity. It will also be apparent that this invention provides novel means for detecting any expansion or contraction of a magnetic recording tape between its condition when a signal is recorded thereon and its condition when the signal is reproduced therefrom. It will be further apparent that this invention provides novel means for selectively expanding or contracting a magnetic recording tape while it is being moved past a magnetic recording or reproducing head. And it should be understood that this invention is by no means limited to the specific embodiments disclosed herein since many modifications can be made in the structure shown without departing from the basic teaching of this invention. For example, it is not necessary to record the signals on oblique tracks as described in this application; the signals can be recorded by any suitable prior art method which allows an overlapping of the signal as taught in this invention. Furthermore it is not necessary to use the specific recording and reproducing structure illustrated herein. This structure can be replaced by any suitable structure which is operable to produce the overlapping signals described herein and to selectively expand or contract the magnetic storage surface, which does not necessarily have to be a tape. These and many other modifications of the invention will be apparent to those skilled in the art, and this invention includes all modifications falling within the scope of the following claims.

I claim:

1. A magnetic recording and reproducing system comprising means adapted to record video signals on a magnetic storage surface, said means being adapted to store one portion of said video signals at two separate physical locations on said storage surface, means adapted to reproduce the signal stored on said magnetic storage surface, said reproducing means being adapted to simlutaneously reproduce said signals stored in said two separate locations, means adapted to compare the signal reproduced from one of said locations with the signal reproduced from the other of said locations and to generate a phase differential signal indicia—the phase difference between said two signals, said phase difference signal indicating a change in the physical dimensions of said magnetic storage surface, and means adapted to change the physical dimensions of said storage surface to counteract for variations detected therein.

2. A magnetic recording and reproducing system comprising recording means adapted to record video signals on a magnetic storage surface, said recording means being adapted to record one portion of said video signals in two physically separate locations on said magnetic storage surface, reproducing means adapted to reproduce signals stored on said magnetic storage surface, said reproducing means being adapted to simultaneously reproduce the signals stored at said two separate locations on said magnetic surface, comparison means adapted to compare the signal reproduced from one of said separate locations with the signal reproduced from the other of said separate locations, said comparison means being adapted to produce a phase difference signal indicating the difference in phase between the signals reproduced from said separate storage locations, said phase difference signal indicating a change in the physical dimensions of said magnetic storage surface, and means adapted to change the physical dimensions of said storage surface in accordance with said phase difference signal to counteract variations in the physical dimensions of said storage surface.

3. A magnetic recording and reproducing system for video signals comprising a magnetic tape recording and reproducing mechanism containing two recording/reproducing heads adapted to trace alternate scans across said magnetic tape, said mechanism being arranged so that said two heads simultaneously scan said tape in an overlapping scan period corresponding to the start and end of each recording track traced across said tape, and means in said mechanisms for selectively expanding or contracting the physical length of said tape along the direction of said recording tracks while said tape is being scanned by said recording/reproducing heads, comparison means coupled to said recording/reproducing heads, said comparison means being adapted to compare the phase of the signals reproduced by said two recording heads in said overlapping scan period and being operable to produce a phase difference signal indicating any phase difference between said signals.

4. The combination defined in claim 3 wherein said magnetic tape recording and reproducing mechanism comprises a guide surface adapted to receive a magnetic tape, a recessed channel formed in said guide surface below said magnetic tape, means adapted to scan said two recording/reproducing heads across said tape along said recessed channel in said guide surface, and means for adjusting the spacing between said guide surface and said recording/reproducing heads to selectively expand or contract the length of said tape along said recording tracks traced thereacross.

5. The combination defined in claim 4 wherein said overlapping scan period occurs in the synchronizing signal portion of said video signal, and wherein said comparison means comprises a sampling circuit adapted to sample the output of said two heads in said overlapping scan period and a pulse comparison circuit adapted to compare the phase of the synchronizing pulses produced by one head with the phase of the synchronizing pulses produced by the other head.

6. The combination defined in claim 5 wherein said guide surface is semi-circular in shape and wherein said two recording/reproducing heads are mounted in a supporting member which is journaled for rotation about the center of said semi-circle.

7. The combination defined in claim 6 wherein said guide surpace is defined by a pair of curved guide members, each of said guide members having a curved surface and both guide members being journaled for rotation about a common shaft and being mounted in such relation as to define a semi-circular guide surface, and cam means adapted to simultaneously move the two guide members about said common shaft.

8. The combination defined in claim 7 and also including an error signal circuit coupled to said pulse comparison circuit and a servo motor coupled between said error signal circuit and said cam means, said error signal circuit being adapted to generate an error signal indicating the mount of the expansion or contraction of the magnetic tape corresponding to said phase difference signals, and said servo motor being responsive to said error signal and being operable to move said guide members in such manner as to counteract said expansion or contraction of said magnetic tape.

9. A magnetic recording and reproducing system for recording video signals on a magnetic storage surface and for reproducing the recorded signals with a high degree of fidelity, said recording and reproducing system comprising a recording and reproducing assembly containing two magnetic recording/reproducing heads, scanning means in said assembly for scanning said two magnetic recording/reproducing heads alternately in predetermined tracks across said magnetic storage surface to record video signals on said magnetic storage surface and to reproduce video signals stored thereon, said scanning means being adapted to produce an overlapping scan period in which both magnetic recording/reproducing heads are simultaneously scanned across different portions of said magnetic storage surface, signal comparison means coupled to said magnetic recording/reproducing heads to compare the output signal of one head to the output signal of the other in said overlapping scan period, said signal comparison means being adapted to produce an output signal indicating any phase difference between the output signals of said two heads in said overlapping scan period, and signal phase shifting means adapted to alter the phase of signals reproduced from said magnetic storage surface to compensate for phase differences detected by said signal comparison means.

10. The combination defined in claim 9 wherein said signal phase shifting means is coupled to said signal comparison means and is responsive to the output signal thereof to automatically minimize the phase difference between the output signals of said two heads in said overlapping scan period.

References Cited by the Examiner

UNITED STATES PATENTS

| | | | |
|---|---|---|---|
| 2,942,061 | 6/60 | Pfost | 178—6.6 |
| 3,012,106 | 12/61 | Brenner | 179—100.2 |
| 3,048,665 | 8/62 | Wilcox | 178—6.6 |

DAVID G. REDINBAUGH, *Primary Examiner.*

ROY LAKE, *Examiner.*